Jan. 20, 1970   P. P. FRISCH   3,490,753
ROTARY PROCESSING APPARATUS
Filed March 4, 1968
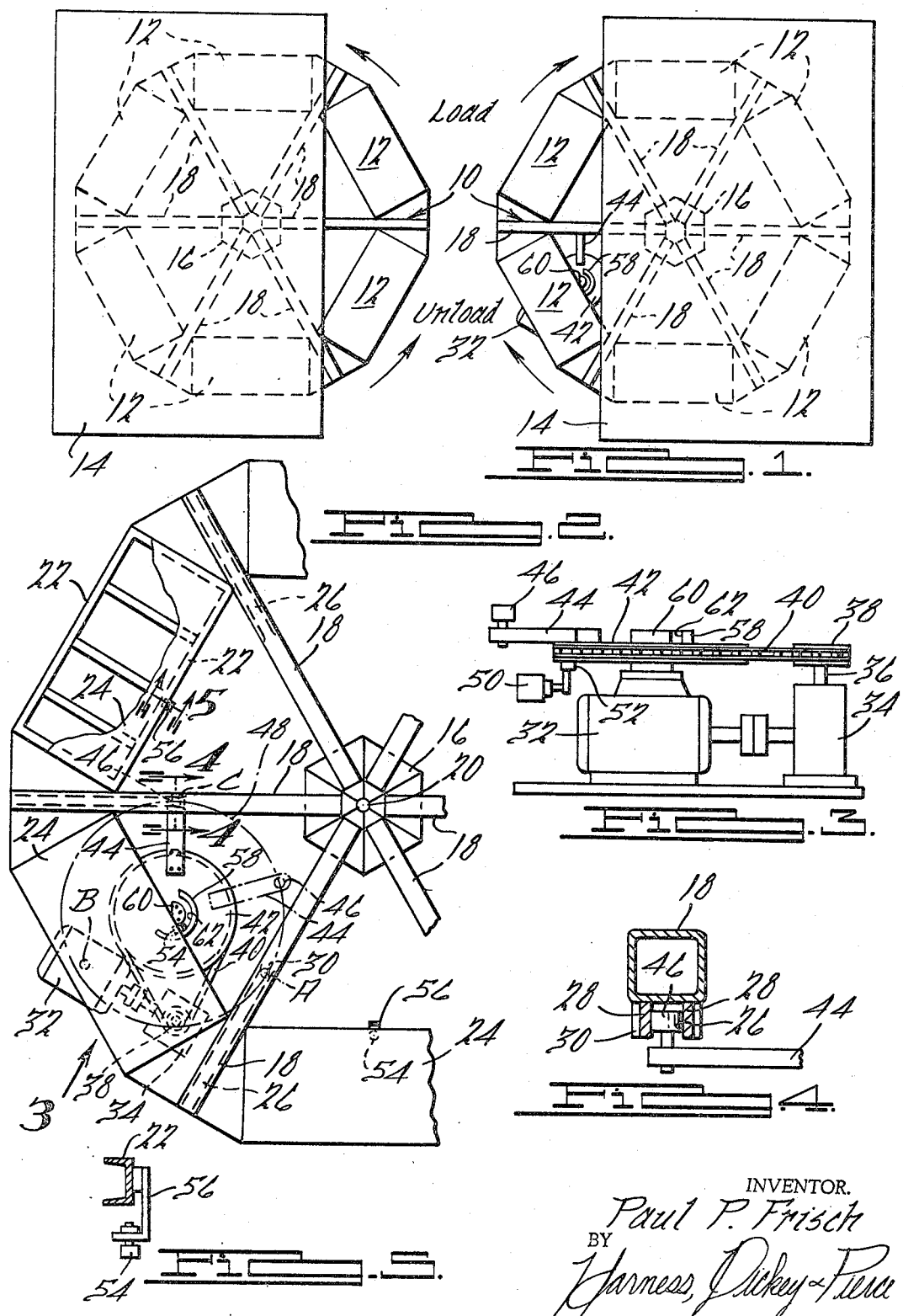
INVENTOR.
Paul P. Frisch
BY
Harness, Dickey & Pierce
ATTORNEYS.

United States Patent Office 3,490,753
Patented Jan. 20, 1970

3,490,753
ROTARY PROCESSING APPARATUS
Paul P. Frisch, Skokie, Ill., assignor to Allen Industries, Inc., a corporation of Delaware
Filed Mar. 4, 1968, Ser. No. 710,240
Int. Cl. F27b 9/16; F27d 3/12; B65g 29/00
U.S. Cl. 263—7                                    7 Claims

ABSTRACT OF THE DISCLOSURE

A processing apparatus including a turnable having a plurality of work stations therearound and including a rotatably mounted framework on which a plurality of radially extending equally angularly spaced rails are mounted and are engageable by drive means including a rotatable engaging member for engaging and moving radially outwardly along one of the rails and, thereafter, radially inwardly and out of engagement with the rail in response to rotation of the engaging member, effecting a corresponding indexing of said turntable in the same direction through a prescribed angular increment.

BACKGROUND OF THE INVENTION

Various apparatuses have been heretofore used or proposed for use for successively conveying workpieces through a series of treating or work stations at which work operations are performed thereon. Processing machines of this general type include turntables having a plurality of work stations disposed along the periphery thereof, which are adapted to be indexed through prescribed angular increments so as to place the work stations in successive aligment with machines or treating apparatuses for performing a work operation on the workpieces retained on the work stations. Various drive mechanisms have heretofore been used for achieving an intermittent indexing of turntables through a prescribed angularity but generally had been found to be deficient in one or more aspects. In many instances, the drive mechanisms of the types heretofore known have not been satisfactory for providing a precise indexing of the turntable such that the work stations thereon are in exact alignment with ancillary equipment for performing a work operation on the workpieces mounted on the turntable. Alternatively, the mechanisms heretofore employed have caused abrupt changes in the velocity of transfer of the work stations between circumferentially spaced points, resulting in the imposition of inertia forces on the equipment mounted on the work stations of the turntable. To overcome this latter deficiency relatively elaborate control systems have been adopted for controlling the acceleration and deceleration of the turntable during each transfer movement. Turntable apparatuses of the aforementioned type have also heretofore necessitated elaborate locking devices for retaining the turntable in an appropriate stationary position at the completion of a transfer movement to prevent undesired drift and misalignment with the processing equipment disposed adjacent thereto.

The foregoing disadvantages are overcome in accordance with the processing machine comprising the present invention, whereby a precise angular indexing of the turntable is achieved and which transfer movement is characterized by a gradual acceleration to a maximum speed of rotation, whereafter a progressive deceleration occurs toward the completion of the transfer movement, minimizing the imposition of inertia forces on the turntable and the components mounted thereon. In addition, the drive mechanism further incorporates positive locking means for retaining the turntable in accurate registry at the completion of a transfer movement and prior to the next transfer movement.

SUMMARY OF THE INVENTION

The foregoing and other advantages and benefits of the present invention are achieved by a processing apparatus which includes a turntable having a plurality of circumferentially-spaced work stations positioned around the periphery thereof, and which turntable consists of a framework which is rotatably mounted at substantially the center thereof and is provided with a plurality of radially extending rails disposed in substantially equal angular increments. Drive means for intermittently indexing the turntable are disposed within the peripheral confines thereof and includes a rotary member having an arm thereon to the end portion of which an engaging member is fixed which in response to rotation thereof, is movable into engagement with the inner end of one of the rails and moves outwardly therealong and thereafter inwardly and out of engagement with the rail, effecting a corresponding indexing movement of the turntable through a prescribed angular increment equivalent to the angularity between adjacent rails. Coacting means are provided on the framework and on the rotary member, which are mutually engageable for retaining the turntable in a rotatably locked position when the engaging member is disposed out of engagement with any of the rails.

The turntable is adapted to be disposed adjacent to a chamber in accordance with one of the embodiments of the present invention for progressively moving molds from a load station into the chamber in which they are adapted to be heated, effecting a curing of the raw material within the mold.

Additional advantages and benefits of the present invention will become apparent upon a reading of the description of the preferred embodiments taken in conjunction with the accompanying drawings.

BRIEF DESCRIPTION OF THE DRAWINGS

FIGURE 1 is a schematic plan view of a pair of processing machines disposed in side-by-side relationship, each incorporating a turntable having six stations, of which two are exposed outwardly of a heating chamber;

FIGURE 2 is an enlarged fragmentary plan view of the framework of a turntable and the drive means therefor;

FIGURE 3 is a fragmentary side elevational view of the drive mechanism and rotary member as viewed in the direction of the arrow indicated at 3 in FIGURE 2;

FIGURE 4 is a vertical transverse sectional view through one of the rails on the turntable as shown in FIGURE 2, and taken substantially along the line 4—4 thereof; and FIGURE 5 is a transverse vertical sectional view of an engaging roller on the framework of the turntable shown in FIGURE 2, and taken substantially along the line 5—5 thereof.

DESCRIPTION OF THE PREFERRED EMBODIMENTS

Referring now in detail to the drawings, and as may be best seen in FIGURE 1, a typical arrangement of the processing apparatus comprising the present invention is illustrated in which a pair of the machines are disposed in opposed relationship for achieving a concurrent loading and unloading thereof. Each machine, as illustrated, comprises a turntable 10, which, in the exemplary embodiment illustrated, is provided with six circumferentially-spaced work stations 12 disposed along the periphery thereof, and of which four are enclosed within a chamber 14, such as a curing oven, for example. The turntable 10 of the machine, on the left-hand side, as indicated in FIGURE 1, rotates in a counterclockwise direction, while the turntable of the right-hand machine rotates in a clockwise direction, whereupon the parts on the work stations emerge from the chambers 14 and are disposed at the unload station at which the finished parts are removed from the turntable. Each of the turntables thereafter is indexed such that the work station is transferred to the load station at which new materials are placed on the work station for processing through the chamber 14. It will be appreciated that the specific number of work stations around the turntable, as well as the particular direction of rotation thereof, can be varied in order to achieve the requisite processing flexibility consistent with the particular work operations being performed.

Each turntable 10, as best seen in FIGURES 2–5, is comprised of a framework consisting of a central trunnion 16, on which a star-shaped frame, consisting of radial beams 18, is rotatably mounted by means of a vertical shaft 20. The outer portions of the beams 18 are securely fastened to each other by channel braces 22, on which platforms 24 are mounted and which in turn serves as a supporting surface for components to be placed on the work station 12.

In the specific embodiment illustrated, the beams 18 are disposed at 60° angular increments corresponding to the angular increment through which the turntable is intermittently indexed. A rail 26 is affixed to the underside of the outer portions of each of the beams 18, as is best seen in FIGURES 2 and 4, and comprises a pair of downwardly depending flanges 28 defining a trackway which is of a substantially inverted U-shape. The radial inward end portions of each of the rails 26 is provided with an outward taper, as indicated at 30, for the purposes subsequently to be described.

Advancement of the turntable through a precise arcuate increment of 60°, in accordance with the embodiment illustrated, is achieved by a drive mechanism, as shown in FIGURES 2 and 3, comprising a motor 32, which is drivingly coupled to a gear reducer 34, to the vertical output shaft 36 of which a sprocket 38 is affixed. A chain 40 is trained around the drive sprocket 38 and extends in engaging relationship around a rotary member 42 having sprocket teeth around the periphery thereof. The rotary member 42 is mounted for rotation about an axis parallel to the axis of rotation of the turntable. A driving arm 44 is affixed to the rotary member 42 and extends radially thereof. An engaging member, such as the engaging roller 46, is rotatably affixed to the upper end portion of the arm 44 and is adapted to be moved into position wherein it is disposed in rolling bearing contact against the inner side surfaces of the flanges 28 defining the rail 26, as best seen in FIGURE 4.

In accordance with this arrangement, the driving means for the turntable, including the motor 32, effects an intermittent rotation of the rotary member and the driving arm 44 thereon through an increment of 360° during each advancement of the turntable. The driving arm 44 is shown in phantom in FIGURE 2 in the normal position at the completion of an advancing movement. In that position, the engaging roller 46, as shown in phantom thereon, is disposed out of engagement with respect to the rails 26. Upon energization of the motor 32, the rotary member moves in a clockwise direction, as viewed in FIGURE 2, whereupon the driving arm and engaging roller 46 are rotated in a circular path as defined by the dotted line indicated at 48, and during which travel the engaging roller 46 moves into engagement with the inner end of the rail 26 and outwardly therealong in response to further rotation, effecting an engagement and indexing movement of the turntable in the same clockwise direction as viewed in FIGURE 2. When the arm 44 is oriented in a radial outward direction with respect to the axis of rotation of the turntable, further rotation of the rotary member effects inward movement of the engaging roller 46 along the rail 26 until the arm assumes the position as shown in solid lines in FIGURE 2. From that position, the engaging roller moves inwardly and out of engagement with the inner end portion of the rail, releasing the turntable. During this travel, the arm and the engaging roller 46 thereon travel at a uniform speed, but the turntable in view of the arcuate travel of the engaging roller relative thereto undergoes a gradual acceleration from the point at which the engaging roller engages the rail, as indicated at point A in FIGURE 2, to a maximum speed of travel when the arm extends in an outward radial direction corresponding to the point B, whereafter the turntable progressively decelerates until it gradually comes to a stop which corresponds to the position of the arm as indicated at C. Further rotation of the rotary member and the arm in a clockwise direction from the position C does not effect the position of the turntable and the arm comes to the normal rest position as indicated in phantom in FIGURE 2.

The de-energization of the motor at the completion of a rotation of the rotary member can suitably be achieved such a by means of a limit switch 50, as best seen in FIGURE 3, which is adapted to be tripped by a cam or an actuator 52 mounted on the underside of the rotary member and angularly positioned so as to trip the limit switch when the arm attains the position shown in phantom in FIGURE 2. A re-energization of the drive motor after a preselected stationary dwell period of the turntable can be achieved manually such as by depressing a suitable button or automatically in accordance with a suitable timer incorporated in the motor circuit of a type well known in the art.

In order to prevent inadvertent movement of the turntable at the completion of a transfer movement and during the period that the engaging roller 46 on the arm 44 is out of engagement with one of the rails 26, suitable coacting means are provided on the drive mechanism and the turntable framework for locking the turntable against rotation. These coacting means comprise a cam follower roller 54, as best seen in FIGURES 2 and 5, which is affixed to a bracket 56 secured to a channel brace 22 of the turntable framework. A circular cam comprising an arcuate outer segment 58 and an arcuate inner segment 60 is mounted on the upper face of the rotary member, as best seen in FIGURE 2, defining therebetween a circular cam track 62 which is disposed concentric to the axis of rotation of the rotary member. The cam follower roller 54 is oriented, as best seen in FIGURE 2, such that it is disposed in alignment with the circular cam track 62 when the turntable has completed its transfer movement. The length of the inner and outer segment 60, 58 defining the cam track is controlled and the disposition thereof on the rotary member is oriented such that an engagement of the cam follower roller 54 with the cam track 62 occurs in response to the rotation of the rotary member at the point that the engaging roller 46 moves out of engagement with the inner end of the rail 26 corresponding to the point indicated at C in FIGURE 2. The concentricity of the circular cam track with respect to the axis of rotation of the rotary member imposes no force upon the cam follower roller 54 during further rotation of the rotary member from the arm position C to the normal stop position, and thereby serves to engage the side surfaces of the cam follower preventing relative movement of the turntable about the shaft 20. The disposition of the arcuate outer segment 58 and arcuate inner segment 60 when the rotary member has completed its movement is illustrated in phantom in FIGURE 2 in which the cam follower is disposed substantially at the central portion thereof.

Upon re-energization of the drive motor resulting in a corresponding clockwise rotation of the rotary member, the cam follower 54 exits the circular cam track at a point corresponding to the point A at which the engaging roller moves into engaging relationship with the next rail on the turntable. Accordingly, the disengagement of the cam follower from the circular cam track releases the turntable for rotation in response to the coaction between the engaging roller and radial rail.

It will be apparent from the foregoing that positive accurate indexing of the turntable through precise angular increments is achieved and whereby a gradual acceleration and deceleration of the turntable is provided at the initiation and at the completion of the transfer movement, while a maximum speed is attained during the intermediate portion of transfer. In addition, the turntable is positively locked at the completion of the transfer movement, assuring continued alignment of the work stations thereon relative to ancillary processing equipment disposed adjacent to the periphery thereof.

While it will be apparent that the invention herein disclosed is well calculated to fulfill the objects above stated, it will be appreciated that the invention is susceptible to modification, variation and change.

What is claimed is:

1. In a processing apparatus, the combination including a turntable having a plurality of circumferentially-spaced work stations disposed therearound, said turntable comprising a framework, means for rotatably mounting said framework, a plurality of rails on said framework disposed in radially extending and in equal angular increments relative to the axis of rotation of said framework, drive means disposed within the periphery of said turntable for intermittently indexing said turntable through the angular increment, said drive means including a rotary member rotatable about an axis parallel to said axis of rotation of said turntable and through an angularity of 360°, an engaging member on said rotary member for removably engaging the inner end portion of one of said rails and moving outwardly therealong and thereafter inwardly and out of engagement therewith in response to rotation of said rotary member effecting an indexing of said turntable in the same direction through said angular increment, and coacting means comprising a cam follower affixed on said framework and a circular cam segment affixed on and disposed concentric to the axis of rotation of said rotary member for receiving and engaging said cam follower for retaining said turntable in an angularly fixed position when said engaging member is disposed out of engagement with one of said rails.

2. In a processing apparatus as defined in claim 1, further including a chamber enclosing a portion of said work stations on said turntable.

3. The processing apparatus as defined in claim 1, wherein said rails are mounted on the underside of said framework and are of an inverted U-shaped configuration, and said engaging member comprises a roller adapted to be movably disposed between the depending flanges of sail rail.

4. The processing apparatus as defined in claim 1, further including means for de-energizing said drive means each time said rotary member has made one complete revolution.

5. The processing apparatus as defined in claim 1, wherein said engaging member is disposed out of engagement with said rails at the completion of an indexing movement.

6. The processing apparatus as defined in claim 1, wherein said turntable incorporates at least four of said rails.

7. The processing apparatus as defined in claim 3, wherein each said rail is provided with an outwardly flared taper at the inner radial end thereof for facilitating engagement and disengagement thereof with said engaging member.

References Cited

UNITED STATES PATENTS 2,271,848 2/1942 Tcimpidis _____ 74—822 X
3,130,032 4/1964 Nischke et al. _____ 263—7 X JOHN J. CAMBY, Primary Examiner U.S. Cl. X.R.

74—822; 198—209